(12) United States Patent
Craske

(10) Patent No.: US 10,073,620 B2
(45) Date of Patent: Sep. 11, 2018

(54) MEMORY MANAGEMENT

(71) Applicant: ARM LIMITED, Cambridge (GB)

(72) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 182 days.

(21) Appl. No.: 14/926,249

(22) Filed: Oct. 29, 2015

(65) Prior Publication Data

US 2016/0154586 A1 Jun. 2, 2016

(30) Foreign Application Priority Data

Dec. 2, 2014 (EP) ..................................... 14195904

(51) Int. Cl.
*G06F 17/00* (2006.01)
*G06F 12/08* (2016.01)
(Continued)

(52) U.S. Cl.
CPC ............ *G06F 3/0604* (2013.01); *G06F 3/064* (2013.01); *G06F 3/0673* (2013.01); *G06F 12/02* (2013.01); *G06F 12/0802* (2013.01); *G06F 12/10* (2013.01); *G06F 12/145* (2013.01); *G06F 12/1441* (2013.01); *G06F 2212/1016* (2013.01); *G06F 2212/60* (2013.01)

(58) Field of Classification Search
CPC . G06F 12/1412; G06F 12/0802; G06F 3/0604
USPC .................................................. 711/118, 202
See application file for complete search history.

(56) References Cited

U.S. PATENT DOCUMENTS 6,094,713 A    7/2000  Khadder et al.
7,068,545 B1   6/2006  Kimelman et al.
(Continued)

FOREIGN PATENT DOCUMENTS

WO    WO 2014/122414    8/2014

OTHER PUBLICATIONS

Stecklina et al., "Design of a tailor-made memory protection unit for low power microcontrollers", *2013 8th IEEE International Symposium on Industrial Embedded Systems (SIES)*, IEEE, Jun. 19, 2013, pp. 225-231.
(Continued)

*Primary Examiner* — Tuan Thai
*Assistant Examiner* — Mohamed Gebril
(74) *Attorney, Agent, or Firm* — Nixon & Vanderhye P.C.

(57) ABSTRACT

Memory management is provided within a data processing system 2 which includes a memory protection unit 8 and defines memory regions within the memory address space which extend between base addresses and limit addresses and have respective attributes associated therewith. When a hit occurs within a memory region which is a valid hit, then block data is generated comprising a mask value and a TAG value (derived from the original query address) which may then be used to identify subsequent hits within at least a portion of that region using a bitwise AND. In another embodiment a micro-translation lookaside buffer is reused by the memory protection unit to store page data identifying pages which fall validly within memory regions and may be used to return attribute data for those pages upon subsequent accesses rather than performing the comparison with the base address and the limit addresses.

5 Claims, 5 Drawing Sheets

Figure 1:
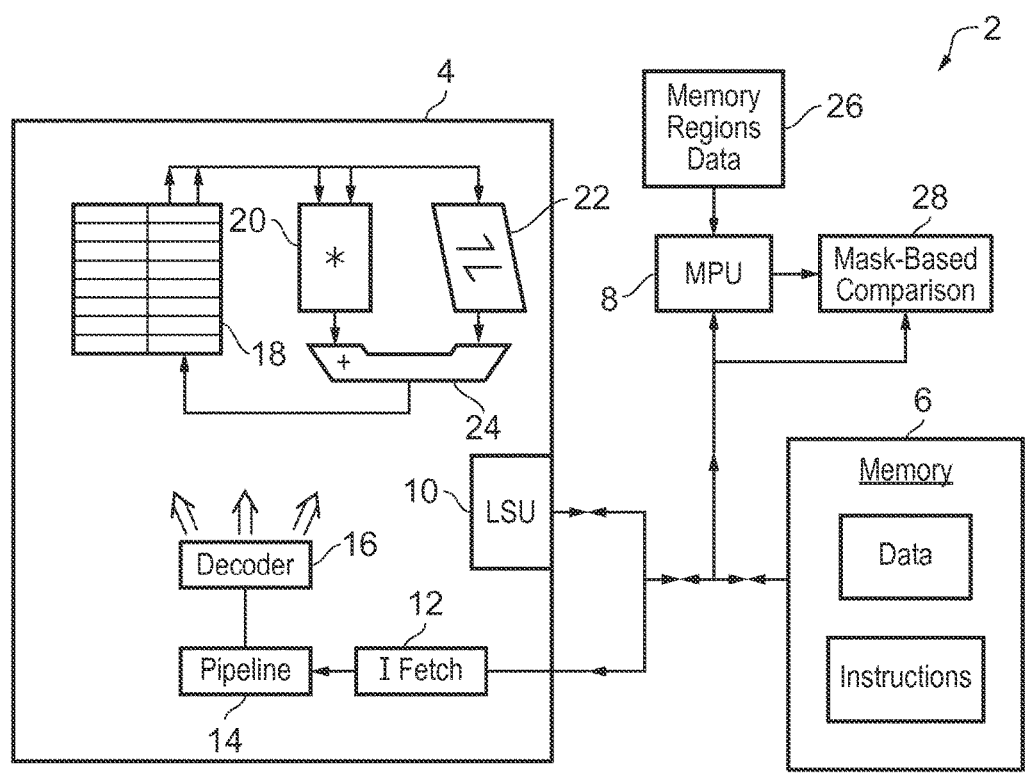

(51) Int. Cl.
*G06F 12/0808* (2016.01)
*G06F 12/0815* (2016.01)
*G06F 3/06* (2006.01)
*G06F 12/0802* (2016.01)
*G06F 12/02* (2006.01)
*G06F 12/10* (2016.01)
*G06F 12/14* (2006.01)

(56) References Cited

U.S. PATENT DOCUMENTS

| | | | |
|---|---|---|---|
| 2004/0177261 A1 | 9/2004 | Watt et al. | |
| 2012/0005454 A1* | 1/2012 | Waugh | G06F 12/1027 |
| | | | 711/207 |
| 2013/0290635 A1* | 10/2013 | Craske | G06F 12/1441 |
| | | | 711/118 |
| 2016/0140046 A1* | 5/2016 | Eddy | G06F 12/0875 |
| | | | 711/169 |

OTHER PUBLICATIONS

EP Search Report for 14195904.9, dated Jun. 24, 2015, nine pages.
European Office Action dated Jun. 15, 2018 in EP Application No. 14195904.9, 11 pages.

\* cited by examiner

MEMORY MANAGEMENT

BACKGROUND

Field

This application claims priority to EP Patent Application No. 14195904.9 filed 2 Dec. 2014, the entire content of which is hereby incorporated by reference.

This disclosure relates to the field of data processing systems. More particularly, this disclosure relates to memory management within data processing systems.

Description

Data processing systems may be provided with memory management capabilities such that one or more attributes (e.g. read only, cacheability, privilege level, etc) may be associated with memory addresses. In some systems a memory management unit using hierarchical page table data may be used to provide, for example, mapping between virtual addresses and physical addresses together with providing attributes to be used for memory addresses lying within specified memory pages. In other systems a memory protection unit may be used in which a memory address space is divided into a plurality of memory regions with programmable boundaries and one or more attributes associated with the respective memory regions.

SUMMARY

In some examples there are provided a method comprising:

specifying a base address and a limit address within a memory address space to define a memory region, memory addresses within said memory region sharing at least one attribute;

comparing a query address with said base address and said limit address to determine if said query address is within said memory region; and if said query address is within said memory region, then:
identifying a memory block within said memory address space including said query address and contiguously extending between a lower block address LBA and an upper block address UBA, where:
UBA-LBA=$2^X$, where X is an integer of zero or greater;
LBA=$N*2^X$, where N is an integer of zero or greater; and
selecting X and N such that said memory block lies wholly within said memory region;
storing block data representing said memory block; and
using said block data to determine if a subsequent query address lies within said memory region.

In further examples there are provided apparatus comprising:

region storage to store a base address and a limit address within a memory address space to define a memory region, memory addresses within said memory region sharing at least one attribute;

comparison circuitry to compare a query address with said base address and said limit address to determine if said query address is within said memory region; and block identifying circuitry to identify, if said query address is within said memory region, a memory block within said memory address space including said query address and contiguously extending between a lower block address LBA and an upper block address UBA, where:
UBA-LBA=$2^X$, where X is an integer of zero or greater;
LBA=$N*2^X$, where N is an integer of zero or greater; and
X and N are such that said memory block lies wholly within said memory region;
block storage to store block data representing said memory block; and
determining circuitry to use said block data to determine if a subsequent query address lies within said memory region.

In further examples there are provided a method comprising:

specifying a base address and a limit address within a memory address space to define a memory region, memory addresses within said memory region sharing at least one attribute;

comparing a query address with said base address and said limit address to determine if said query address is within said memory region; and if said query address is within said memory region, then:
identifying a page of memory among a plurality of pages of memory within said memory address space that includes said query address and is wholly within said memory region;
storing page data representing said page of memory; and
using said page data to determine if a subsequent query address lies within said memory region.

In further examples there are provided apparatus comprising:

region storage to store a base address and a limit address within a memory address space to define a memory region, memory addresses within said memory region sharing at least one attribute;

comparison circuitry to compare a query address with said base address and said limit address to determine if said query address is within said memory region; and page identifying circuitry to identify a page of memory among a plurality of pages of memory within said memory address space that includes said query address and is wholly within said memory region page storage to store page data representing said page; and determining circuitry to use said page data to determine if a subsequent query address lies within said page.

The above, and other objects, features and advantages of this disclosure will be apparent from the following detailed description of illustrative embodiments which is to be read in connection with the accompanying drawings.

DRAWINGS

Figure 2:
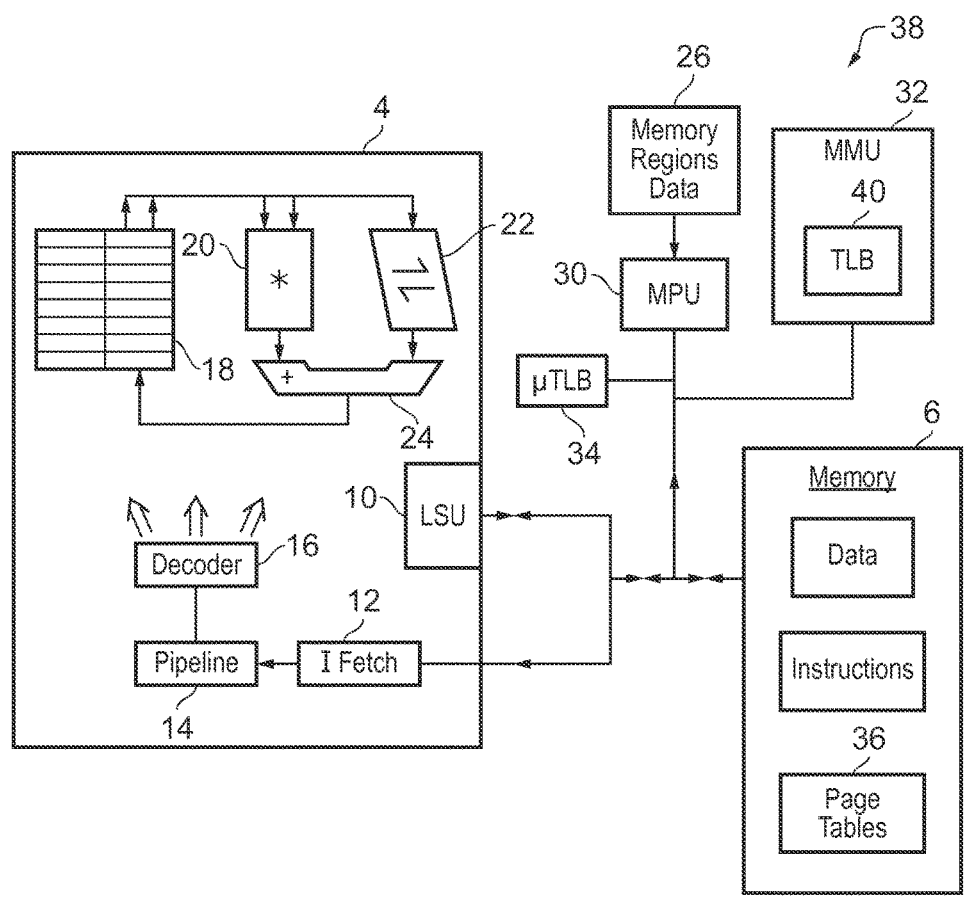
Figure 3:
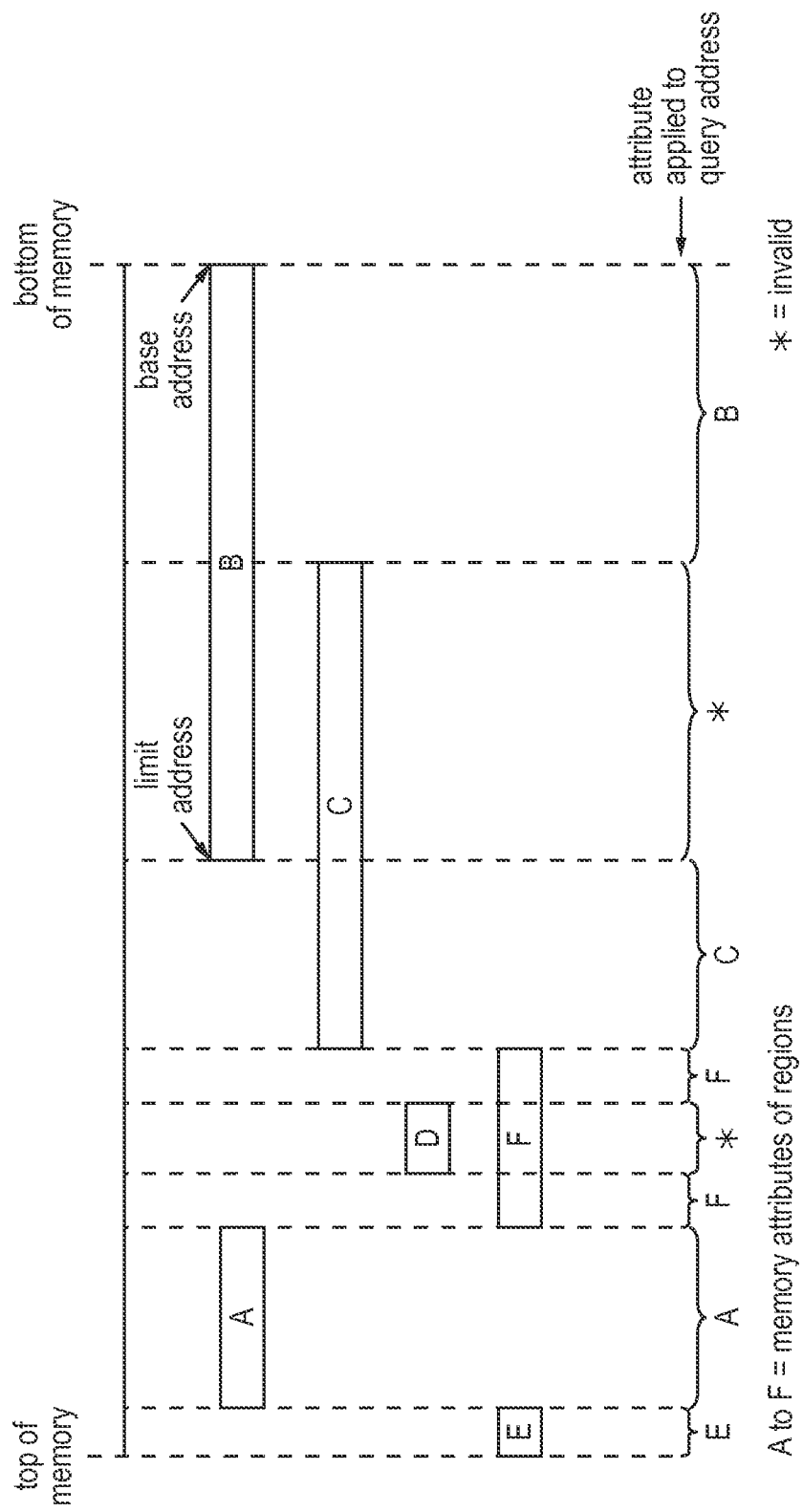
Figure 4:
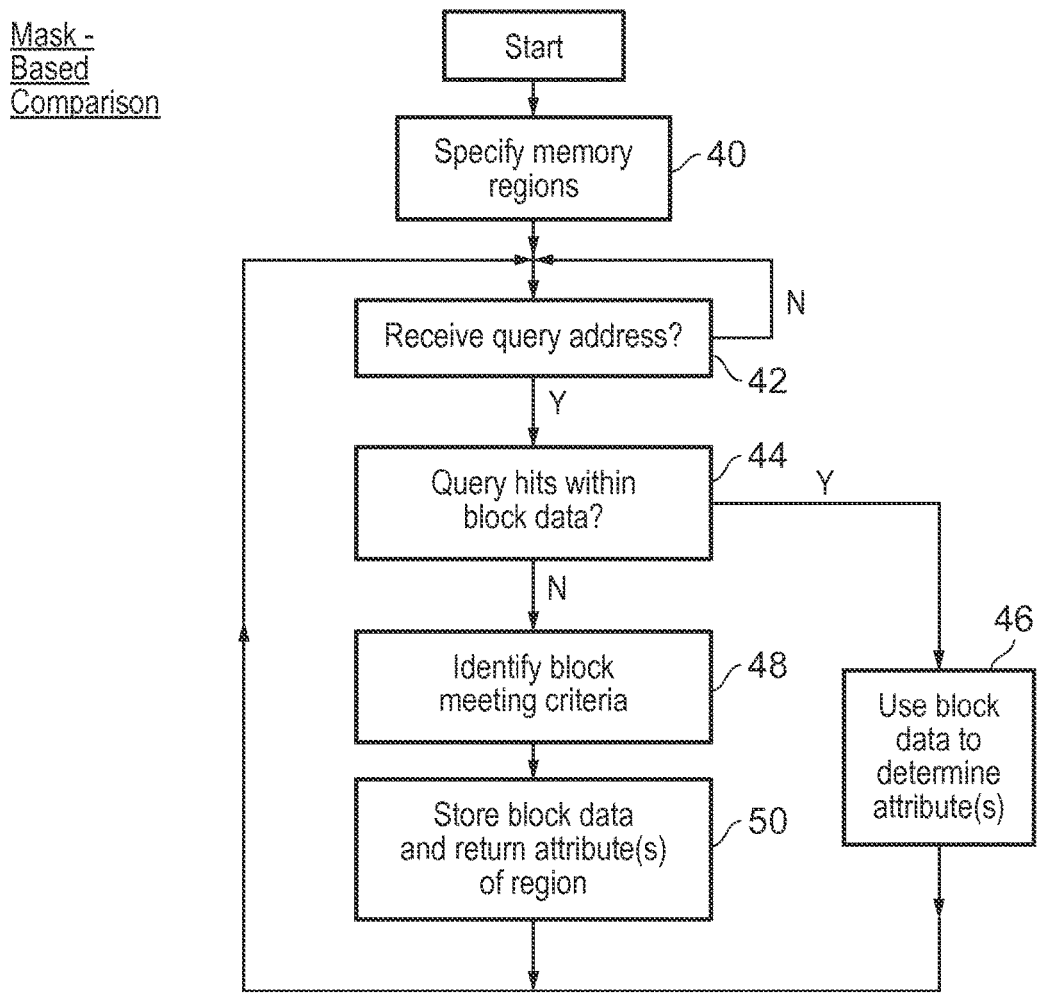
Figure 5:
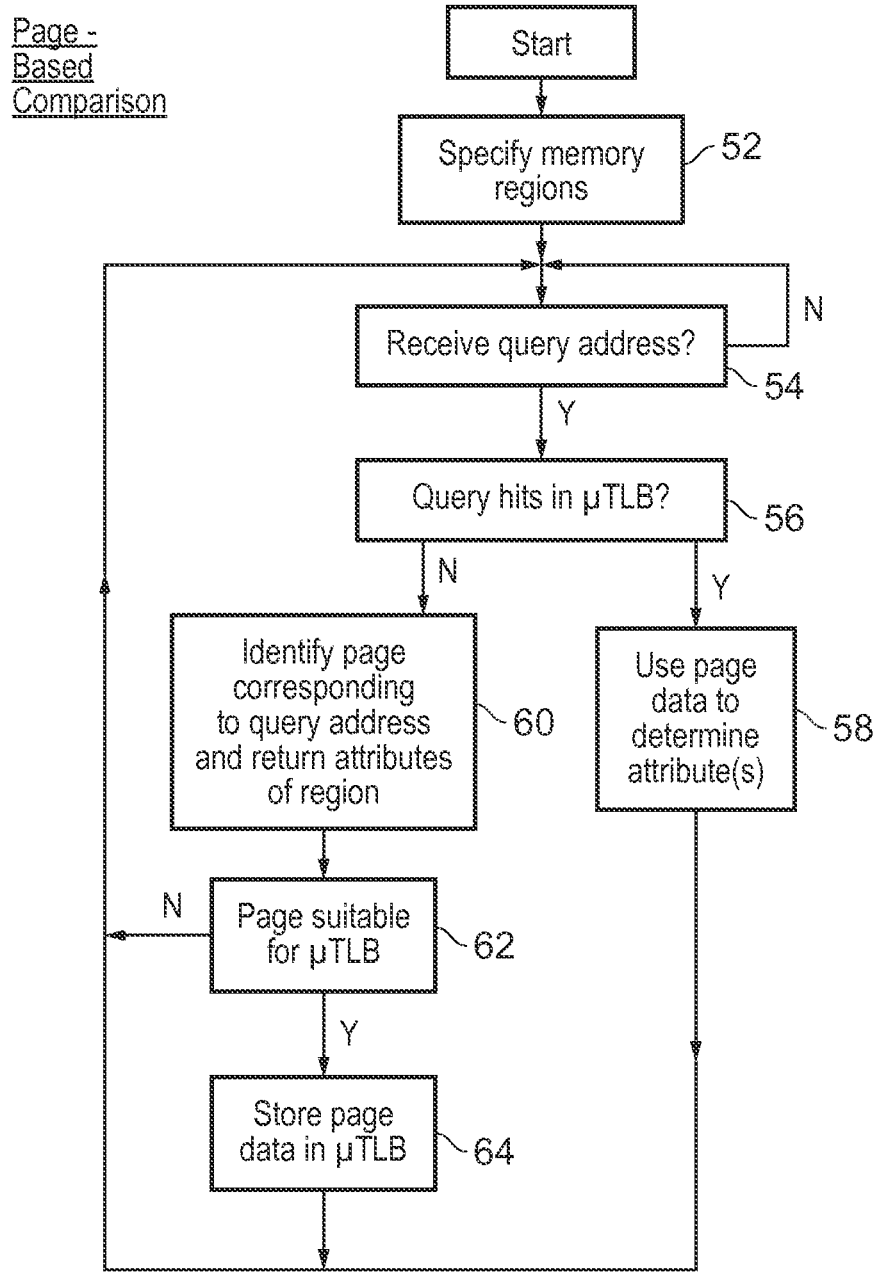

FIG. 1 schematically illustrates a data processing system incorporating a memory protection unit;

FIG. 2 schematically illustrates a data processing system incorporating both a memory protection unit and a memory management unit;

FIG. 3 schematically illustrates the division of memory address space into a plurality of memory regions having associated memory attributes;

FIG. 4 is a flow diagram schematically illustrating determining one or more memory attributes using a mask based comparison; and FIG. 5 is a flow diagram schematically illustrating determining one or more attributes using a page based comparison.

EMBODIMENTS

FIG. 1 schematically illustrates a data processing system 2 including a processor core 4, a memory 6 and a memory protection unit 8. The memory 6 stores both program instructions to be executed by the processor core 4 and data to be manipulated by the processor core 4. The processor core 4 includes a load store unit 10 for performing reads and writes of data values to and from the memory 6. An instruction fetch unit 12 fetches program instructions from the memory 6 for supply to an instruction pipeline 14. The program instructions are decoded by an instruction decoder 16 which generates control signals for controlling other portions of the processor core 4, such as a general purpose register file, a multiplier 20, a shifter 22 and an adder 4.

The memory protection unit 8 serves to associate one or more programmable attribute values with memory addresses within the memory address space of the memory 6. The memory address space may be divided into a plurality of memory region: the memory addresses within these regions sharing at least one attribute. For example, one memory region may be defined as permitting read only memory access operations, while a different memory region may be defined as permitting both read and write memory access operations. The memory regions are defined by a base address within the memory address space and a limit address within the memory address space. A memory region extends from its base address to its limit address. The base address and the limit address may be subject to some degree of alignment, such as, for example, 32 byte alignment or 64 byte alignment. The base addresses and limit addresses together with the associated attributes for the memory regions they define are stored within a memory regions data store 26 from where they may be accessed by the memory protection unit 8. The base addresses, the limit addresses, and the memory attributes may all be programmable so that the system designer can divide the memory address space as they wish and associate different attributes with different memory regions within that memory address space.

In operation, when a query address is received by the memory protection unit 8 and it is the first address received for a given memory region, the memory protection unit 8 uses the base address data and the limit address data within the memory regions data store 26 to determine within which of the memory regions, the query address lies. If the memory regions overlap and a query address is identified as falling within more than one memory region, then, in this example embodiment, the query address is treated as invalid. Accordingly, attribute data is returned for a query address when the query address lies within a single memory region.

When a query address for a memory region is accessed for the first time, then as well as returning the one or more attribute values for that query address, the memory protection unit 8 serves to identify a memory block within the memory address space that concludes the query address and contiguously extends between a lower block address LBA and an upper block address UBA. These memory blocks may be used to form mask values which together with a TAG value derived from the query address used to generate the respective mask values are stored within a mask-based comparison unit 28. Mask-based comparison may be performed more rapidly than the comparison performed by the memory protection unit 8 against the base address and the limit address. The memory protection unit 8 when comparing against the base address and the limit address uses a test that the query address is greater than or equal to the base address and less than or equal to the limit address. Such comparisons are relatively slow. By contrast, the mask-based comparison performed by the mask-based comparison unit 28 may be performed with simple AND operations (or other simple logical operations) as will be described further below.

When a further query address is generated by either the load/store unit 10 or the instruction fetch unit 12, then it is supplied to both the memory protection unit 8 and the mask-based comparison unit 28. If the mask-based comparison unit 28 is storing mask data and TAG data (together constituting block data) specifying a memory block known to lie wholly within a memory region as previously identified by the memory protection unit 8, then a hit may be registered by the mask-based comparison unit 28 and the attribute data stored therein returned more rapidly and with a lower energy cost compared to the full comparison being performed by the memory protection unit 8.

The lower block address LBA and the upper block address UBA are selected so as to meet a plurality of constraints. More particularly, $UBA-LBA=2^X$, where X is an integer of zero or greater; $LBA=N*2^X$, where N is an integer of zero or greater; and X and N are selected such that the memory block lies wholly within the memory region within which the query address has been identified as lying. In some embodiments X is selected to have a maximum integer value for which there is an integer value of N that permits the memory block to lie wholly within the memory region concerned. This permits the memory block to be larger, so making better use of the finite storage which may be provided for mask values and TAG query addresses (block data) within the mask-based comparison unit 28.

The determination performed by the memory protection unit 8 using the base address and the limit address stored within the memory regions data store 26 is such that a single precise region hit for a region within a given N-bit base, limit and enable flag for a given query is computable using hit=enable AND (limit[N−1:0]>=query[N−1:0]) AND (base[N−1:0]<=query[N−1:0]);

In this example embodiment, this hit value is considered valid if, and only if, one region hits for a given query address. If more than one region hits, then the query address is considered invalid. This permits regions of the memory address space to be marked as invalid and blocked from use by the data processing system 2.

As mentioned above, when there is a hit for a single region, and there is no hit within the mask-based comparison unit 28, then a memory block is identified for that hit such that corresponding block data (a mask value and a TAG value derived form a query value that generated that mask value) may be stored within the mask-comparison unit 28. The processing performed by the memory protection unit 8 to determine a mask value for use with a TAG value that will define a memory block, a lower block address and an upper block address as previously discussed may be as follows for a single region hit with an N-bit base address, a limit address and a query address.

delta_base[N−1:0]=query[N−1:0]XOR base[N−1:0];
    delta_limit[N−1:0]=query[N−1:0]XOR limit[N−1:0];
    for(i=0;i<N;i++)
       discord_base[i]=OR delta_base[N−1:i];
       discord_limit[i]=OR delta_limit[N−1:i];
       aligned_base[i]=NOR base[i:0];
       aligned_limit[i]=AND limit[i:0];
    mask_base[N−1:0]={1'b0, discord_base[N−1:1]} OR aligned_base;
    mask_limit[N−1:0]={(1'b0, discord_limit[N−1:1]} OR aligned_limit;
    mask[N−1:0]={N{~enable}} OR (mask_base[N−1:0] AND mask_limit[N−1:0]);

It will be noted that constant propagation may also be applied in the above calculations based upon the minimum granularity of the memory region definitions, e.g. 32-byte aligned, 64-byte aligned as previously discussed and as a consequence of which a corresponding number of the lowest significant bits of the limit address and the base address may effectively all be zeros.

When the block data has been formed and stored within the mask-based comparison unit 28, it can be used to identify a hit within that same memory block using a simple bitwise logical AND comparison with the resultant memory block being valid (a hit for which the same memory attributes should be associated) for any subsequent query where:
(Mask AND new_query)==(mask AND query_at_generation);

It will be appreciated that in parallel to the mask-based comparison described above, the full comparison based upon the greater than or equal to and less than or equal to tests against the base address and the limit address may also be required, for a at least the first access of a query address within a memory block, in order to extract the attributes associated with that memory block and to manage region overlap.

The memory regions data store 26 serves as region storage for the base address and the limit address together with attribute data associated with the memory regions defined thereby. The memory protection unit 8 serves as comparison circuitry for comparing a query address with the base address and the limit address to determine if the query address is within a memory region. The memory protection unit 8 also serves as block identifying circuitry to identify a memory block as discussed above. The mask-based comparison unit 28 serves as block storage for storing block data defining the memory blocks and as determining circuitry for using the block data to determine if a subsequent query address lies within a memory region.

Given below are a number of worked examples in which the end result is that block data defining a memory block is created with a mask value and an old "originating" query value given by "query_i & ~mask".
Future querys can then be checked against the expression:
    hit=(query_i & ~mask)==tag
The results of mask_o for all MPU regions can be AND'd together to produce the largest region which does not interact with the boundaries of any region.

|  | Example 1. | Example 2. | Example 3. | Example 4. |
|---|---|---|---|---|
| query_i | 0x1234567 | 0x1234567 | 0x1234567 | 0x0000002 |
| base_i | 0x0000000 | 0x1000000 | 0x0000001 | 0x0000001 |
| limit_i | 0x7ffffff | 0x7ffffff | 0x7ffffff | 0x7ffffff |
| delta_base | 0x091a2b3 | 0x011a2b3 | 0x091a2b3 | 0x0000001 |
| delta_limit | 0x36e5d4c | 0x36e5d4c | 0x36e5d4c | 0x3ffffe |
| discord_base | 0x0ffffff | 0x01fffff | 0x0ffffff | 0x0000001 |
| discord_limit | 0x3ffffff | 0x3ffffff | 0x3ffffff | 0x3ffffff |
| aligned_base | 0x7ffffff | 0x0ffffff | 0x0000000 | 0x0000000 |
| aligned_limit | 0x7ffffff | 0x7ffffff | 0x7ffffff | 0x7ffffff |
| mask_base | 0x7ffffff | 0x0ffffff | 0x0ffffff | 0x0000001 |
| mask_limit | 0x7ffffff | 0x7ffffff | 0x7ffffff | 0x7ffffff |
| mask_o | 0x7ffffff | 0x0ffffff | 0x0ffffff | 0x0000001 |

Example 1. Base and limit at extremities, mask is all ones. Base moved to
Example 2. 0x1000000
Example 3. Base moved to just above zero
Example 4. Query moved next to base FIG. 2 illustrates a further example data processing system 38. Within FIG. 2 elements common to FIG. 1 are given the same reference numerals. The example embodiment of FIG. 2 includes both a memory protection unit 30 and a memory management unit 32. The memory management unit 32 performs page table based memory management using hierarchical page table data 46 stored within the memory 6 and a translation lookaside buffer 30 in a manner that will be familiar to those in this technical field (e.g. page table walks). The memory address space is divided into fixed size memory pages, such as, for example, 4 kB memory pages. Each of these memory pages has attribute data associated therewith.

A micro-translation lookaside buffer 34 may be provided to store, for more rapid access, data identifying the most recently used pages of memory together with their attribute data in order to speed up memory access operations and reduce energy consumed.

The memory protection unit 30, which may be used in some modes of operation instead of the memory management unit 32, divides the memory address space into memory regions defined by base addresses, limit addresses and attributes as previously discussed. However, in this example embodiment, the micro-translation lookaside buffer 34 is reused by the memory protection unit 30 to store page-based data derived from the memory region data stored within the memory regions data store 26. The memory pages which are represented by the entries within the micro-translation lookaside buffer 34 may be considered as replacements for the memory blocks discussed previously in relation to the example embodiment of FIG. 1. The memory pages are a fixed size for a given implementation.

When a query address misses within the micro-translation lookaside buffer 34 and the memory protection unit 30 is active in generating the memory attributes, then a new page entry may be made within the micro-translation lookaside buffer 34 by the memory protection unit 30 performing the processing described below. In this example the base address and the limit address are 64-byte aligned and the bits [4:0] of the addresses may be ignored and the memory pages are 4 kB in size as previously mentioned. The processing performed by the memory protection unit 30 may be represented as:

// Compare query with base and limit and base and limit
        with page boundaries
    limit_at_top=AND limit[10:5]; // region limit coincides
        with top of a page
    base_at_bot=NOR base[10:5]; // region base coincides
        with bottom of a page
    limit_etq_hi=query[31:11]=limit[31:11]; // query in same
        page as limit
    limit_gt_qhi=query[31:11]<limit[31:11]; // query below
        limit page
    limit_ge_qlo=query[10:5]<=limit[10:5]; //query lower in
        a page than limit
    base_eq_qhi=query[31:11]=base[31:11]; // query in same
        page as base
    base_lt_qhi=query[31:11]>base[31:11]; // query above
        base page
    base_le_qlo=query[10:5]>=base[10:5]; // query higher in
        a page than base
    // Entire page between query and limit if below limit page
        or inside and limit at top limit_page_ok=limit_gt_qhi
        OR limit_eq_qhi AND limit_at_top;
    // Entire page between query and base if above base page
        or    inside    and    base    at    bottom
        base_page_ok=base_lt_qhi OR base_eq_qhi AND
        base_at_bot;

limit_hit_ok=limit_gt_qhi OR limit_eq_qhi AND limit_ge_qlo; // Query at or below limit
base_hit_ok=base_lt_qhi OR base_eq_qhi AND base_le_qlo; // Query at or above base
// Region infringes on query page in someway
infringes=limit_gt_qhi AND base_lt_qhi OR limit_eq_qhi OR base_eq_qhi;
// Determine page level and precise hit
page=limit_page_ok AND base_page_ok;
hit=limit_hit_ok AND base_hit_ok:

In this example, this processing is performed for all of the regions defined by the data stored within the memory region data store 26 and a hit is considered valid if it is the only hit which arises. An aligned query address is suitable for inclusion as new page data within the micro-translation lookaside buffer 34 if there is a single true value of "infringes" and the hit region has a true value for "page".

FIG. 3 schematically illustrates the division of memory address space extending between a bottom of memory and a top of memory into a plurality of memory regions. Each of these memory regions extends between a base address and a limit address. Each of these memory regions has one or more attributes, such as read only, read and write, cacheable, etc associated with it for use with memory addresses within the memory address space falling within that memory region and that do not fall within any of the other memory regions. Memory address space corresponding to overlapping memory regions is considered as invalid and is marked in FIG. 3 with "*". When a query address lies within a single memory region, then the attributes associated with that single memory region are returned for the query address concerned by the memory management systems of FIGS. 1 and 2.

FIG. 4 is a flow diagram schematically illustrating mask-based comparison in accordance with the example of FIG. 1. At step 40 memory regions are specified and the data defining these memory regions is stored within the memory region data store 26. At step 42 a query address is received. Step 44 then determines whether or not the received query address hits with the block data stored and used by the mask-based comparison unit 28. If there is a hit, then step 46 serves to use the block data to determine the attributes for the received query address.

If the query address received at step 42 does not hit within the block data, then step 48 serves to identify a memory block (if possible) meeting the criteria previously discussed. Such a memory block is identified to have the largest power of two size which is aligned relative to that power of two size and that lies wholly within the memory region for which the hit has occurred. Step 50 then stores the block data in the form of the mask value and the TAG (derived from the original query address) as described above into the memory-based comparison unit 28 for further use as well as returning the attribute data which has been read from the memory region.

FIG. 5 is a flow diagram schematically illustrating the operation of the page-based comparison performed in the example embodiment of FIG. 2. At step 52 memory regions are specified using base addresses and limit addresses together with attribute values and stored within the memory regions data store 26. At step 54 processing waits until a query address is received. Step 56 the determines whether or not the query address hits within the micro-translation lookaside buffer 34. If there is a hit within the micro-translation lookaside buffer 34, then step 58 uses the page data stored therein to determine the attributes associated with the query address. If there is no hit within the micro-translation lookaside buffer 34, then step 60 identifies a page (of the size used by the memory management unit 32 and as defined by the page table data 36), which corresponds to the query address and returns the attributes of the memory region as read from the memory regions data store 26. Step 62 then determines whether the page identified is suitable for storage within the micro-translation lookaside buffer 34 as previously described. If the page table data is suitable for storage and reuse accordingly to the above criteria, then step 64 serves to store the page data into the micro-translation lookaside buffer 34 where it can be used to generate a more rapid hit if another query address arises which lies within that page.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

Various aspects of the disclosure are set out in the following clauses:

CLAUSES

1. A method comprising:
   specifying a base address and a limit address within a memory address space to define a memory region, memory addresses within said memory region sharing at least one attribute;
   comparing a query address with said base address and said limit address to determine if said query address is within said memory region; and
   if said query address is within said memory region, then:
      identifying a memory block within said memory address space including said query address and contiguously extending between a lower block address LBA and an upper block address UBA, where:
         UBA-LBA=$2^X$, where X is an integer of zero or greater;
         LBA=$N*2^X$, where N is an integer of zero or greater; and
         selecting X and N such that said memory block lies wholly within said memory region;
      storing block data representing said memory block; and
      using said block data to determine if a subsequent query address lies within said memory region.

2. A method as in clause 1, wherein X is selected to have a maximum integer value for which there is an integer value of N that permits said memory block to lie wholly within said memory region.

3. A method as in clause 1 and 2, wherein said block data comprises a mask value and an old query value representing said query address used in said identifying of said memory block.

4. A method as in clause 3, wherein said using said block data comprises a determining whether a bitwise AND of said mask value and said old query value matches a bitwise AND of said mask value and a new query value representing said subsequent query address.

5. A method as in any one of the previous clauses, wherein said identifying comprises:
   determining a base difference value comprising a bitwise exclusive OR of said query address and said base address; and determining a limit difference value comprising a bitwise exclusive OR of said query address and said limit address.

6. A method as in clause 5, wherein said identifying comprises:
determining a base discord value with each bit value of said base discord value corresponding to an OR of a bit value at a corresponding bit position of a same significance within said base difference value with all bit values at more significant bit positions than said corresponding bit position within said base difference value; and
determining a limit discord value with each bit value of said limit discord value corresponding to an OR of a bit value at a corresponding bit position of a same significance within said limit difference value with all bit values at more significant bit positions than said corresponding bit position within said limit difference value.

7. A method as in any one of the preceding clauses, wherein said identifying comprises:
determining a base aligned value with each bit value of said base aligned value corresponding to a NOR of a bit value at a corresponding bit position of a same significance within said base address with all bit values at less significant bit positions than said corresponding bit position within said base address; and
determining a limit aligned value with each bit value of said limit aligned value corresponding to an AND of a bit value at a corresponding bit position of a same significance within said limit address with all bit values at less significant bit positions than said corresponding bit position within said limit address.

8. A method as in clauses 7 and 8, wherein said identifying comprise:
determining a base mask value corresponding to a bitwise OR of said base discord value and said base aligned value; and
determining a limit mask value corresponding to a bitwise OR of said limit discord value and said limit aligned value.

9. A method as in clauses 3 and 8, wherein at least a portion of said mask value comprises a bitwise AND of said base mask value and said limit mask value.

10. A method as in clause 9, wherein a most significant bit of said mask value comprises an enable bit indicating whether said memory block corresponding to said mask value is active.

11. A method as in any one of the previous clauses, wherein said memory address space comprises a plurality of memory regions wherein a corresponding memory blocks is identified for each of said plurality memory regions that contain said query address.

12. A method as in clauses 9 and 11, wherein said block data comprises a bitwise AND of masks values for each memory block identified.

13. Apparatus comprising:
region storage to store a base address and a limit address within a memory address space to define a memory region, memory addresses within said memory region sharing at least one attribute;
comparison circuitry to compare a query address with said base address and said limit address to determine if said query address is within said memory region; and
block identifying circuitry to identify, if said query address is within said memory region, a memory block within said memory address space including said query address and contiguously extending between a lower block address LBA and an upper block address UBA, where:
UBA-LBA=$2^X$, where X is an integer of zero or greater;
LBA=$N*2^X$, where N is an integer of zero or greater; and
X and N are such that said memory block lies wholly within said memory region;
block storage to store block data representing said memory block; and
determining circuitry to use said block data to determine if a subsequent query address lies within said memory region.

14. A method comprising:
specifying a base address and a limit address within a memory address space to define a memory region, memory addresses within said memory region sharing at least one attribute;
comparing a query address with said base address and said limit address to determine if said query address is within said memory region; and
if said query address is within said memory region, then:
identifying a page of memory among a plurality of pages of memory within said memory address space that includes said query address and is wholly within said memory region;
storing page data representing said page of memory; and
using said page data to determine if a subsequent query address lies within said memory region.

15. A method as in clause 14, comprising operating in a mode using hierarchical page table data to provide memory attribute data associated with respective ones of said plurality of pages.

16. A method as in any one of clauses 14 and 15, wherein said plurality of pages are a plurality of fixed size pages.

17. A method as in any one of clauses 14, 15 and 16, wherein said identifying comprises:
determining if said limit address coincides with a top of one of said plurality of pages; and
determining if said base address coincides with a bottom of one of said plurality of pages.

18. A method as in any one of clauses 14 to 17, wherein said identifying comprises:
determining if said limit address is within a same page of one of said plurality of pages as said query address; and
determining if said base address is within a same page of one of said plurality of pages as said query address.

19. A method as in any one of clauses 14 to 18, wherein said identifying comprises:
determining if said query address is within a page of one of said plurality of pages lower within said memory address space than a page of said plurality of pages including said limit address; and
determining if said query address is within a page of one of said plurality of pages higher within said memory address space than a page of said plurality of pages including said base address.

20. A method as in any one of clauses 14 to 19, wherein said identifying comprises:
determining if said query address is relatively lower within a page of one of said plurality of pages including said query address than said limit address is within a page of said plurality of pages including said limit address; and determining if said query address is relatively higher within a page of one of said plurality of pages including said query address than said base address is within a page of said plurality of pages including said base address.

21. A method as in any one of clauses 14 to 16, wherein said storing is not performed unless:
said query address is within a page of one of said plurality of pages lower within said memory address space than a page of said plurality of pages including said limit address or said limit address is within a same page of one of said plurality of pages as said query address and said limit address coincides with a top of one of said plurality of pages; and
said query address is within a page of one of said plurality of pages higher within said memory address space than a page of said plurality of pages including said base address or said base address is within a same page of one of said plurality of pages as said query address and said base address coincides with a bottom of one of said plurality of pages.

22. A method as in any one of clauses 14 to 16 and 21, wherein said memory address space comprises a plurality of memory regions and said storing is not performed if more than one of said plurality of memory regions is located such that:
said query address is within a page of one of said plurality of pages lower within said memory address space than a page of said plurality of pages including said limit address and if said query address is within a page of one of said plurality of pages higher within said memory address space than a page of said plurality of pages including said base address; or
said limit address is within a same page of one of said plurality of pages as said query address; or
said base address is within a same page of one of said plurality of pages as said query address.

23. A method as in any one of clauses 14 to 16, 21 and 22, wherein said memory address space comprises a plurality of memory regions and a valid hit within one of said plurality of memory regions is not registered more than one of said plurality of memory regions is located such that:
said query address is within a page of one of said plurality of pages lower within said memory address space than a page of said plurality of pages including said limit address or said limit address is within a same page of one of said plurality of pages as said query address and said query address is relatively lower within said same page than said limit address; and
if said query address is within a page of one of said plurality of pages higher within said memory address space than a page of said plurality of pages including said base address or if said base address is within a same page of one of said plurality of pages as said query address and said query address is relatively higher within said same page than said base address.

24. A method as in any one of clauses 14 to 23, wherein said storing is storing within a translation lookaside buffer.

25. A method as in any one of clauses 14 to 23, wherein said storing is within a micro translation lookaside buffer within an apparatus containing both said micro translation lookaside buffer and a main translation lookaside buffer.

26. Apparatus comprising:
region storage to store a base address and a limit address within a memory address space to define a memory region, memory addresses within said memory region sharing at least one attribute;
comparison circuitry to compare a query address with said base address and said limit address to determine if said query address is within said memory region; and
page identifying circuitry to identify a page of memory among a plurality of pages of memory within said memory address space that includes said query address and is wholly within said memory region
page storage to store page data representing said page; and
determining circuitry to use said page data to determine if a subsequent query address lies within said page.

I claim:
1. A method comprising:
specifying a base address and a limit address within a memory address space to define a memory region, memory addresses within said memory region sharing at least one attribute;
comparing a query address with said base address and said limit address to determine if said query address is within said memory region; and
if said query address is within said memory region, then:
identifying a memory block within said memory address space including said query address and contiguously extending between a lower block address LBA and an upper block address UBA, where:
$UBA-LBA=2^X$, where X is an integer of zero or greater;
$LBA=N*2^X$, where N is an integer of zero or greater; and
selecting X and N such that said memory block lies wholly within said memory region;
storing block data representing said memory block; and
using said block data to determine if a subsequent query address lies within said memory region;
wherein X is selected to have a maximum integer value for which there is an integer value of N that permits said memory block to lie wholly within said memory region.

2. A method as claimed in claim 1, wherein said block data comprises a mask value and an old query value representing said query address used in said identifying of said memory block.

3. A method as claimed in claim 2, wherein said using said block data comprises a determining whether a bitwise AND of said mask value and said old query value matches a bitwise AND of said mask value and a new query value representing said subsequent query address.

4. A method as claimed in claim 1, wherein said memory address space comprises a plurality of memory regions wherein a corresponding memory block is identified for each of said plurality memory regions that contain said query address.

5. An apparatus comprising:
region storage to store a base address and a limit address within a memory address space to define a memory region, memory addresses within said memory region sharing at least one attribute;
comparison circuitry to compare a query address with said base address and said limit address to determine if said query address is within said memory region; and
block identifying circuitry to identify, if said query address is within said memory region, a memory block within said memory address space including said query address and contiguously extending between a lower block address LBA and an upper block address UBA, where:

UBA-LBA=$2^X$, where X is an integer of zero or greater;

LBA=$N*2^X$, where N is an integer of zero or greater; and

X and N are such that said memory block lies wholly within said memory region; block storage to store block data representing said memory block; and determining circuitry to use said block data to determine if a subsequent query address lies within said memory region;

wherein X is selected to have a maximum integer value for which there is an integer value of N that permits said memory block to lie wholly within said memory region.

* * * * *